Nov. 4, 1924.
H. G. KIMBER
RAKE
Filed May 10, 1923
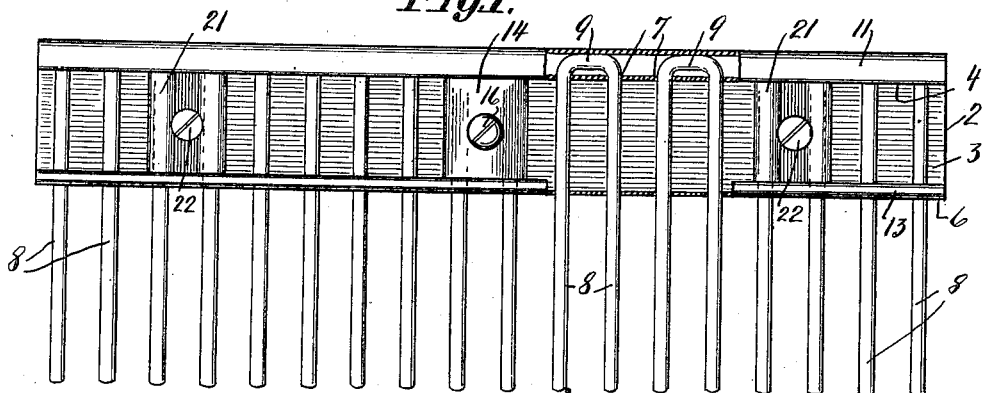
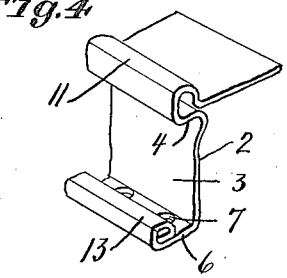
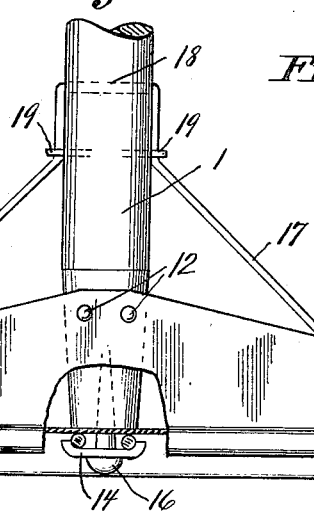
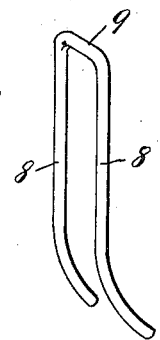
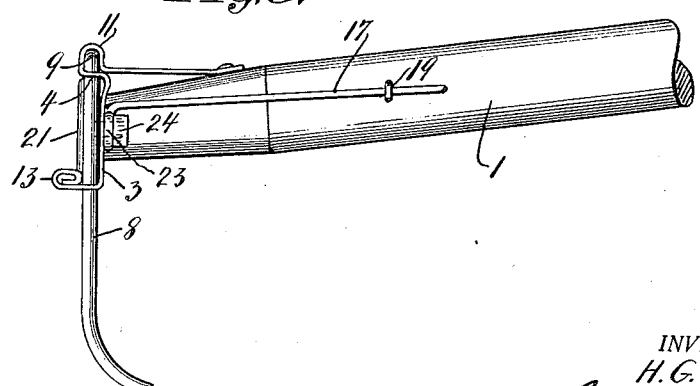
INVENTOR.
H. G. Kimber
BY
ATTORNEYS.

Patented Nov. 4, 1924.

1,514,291

UNITED STATES PATENT OFFICE.

HERBERT G. KIMBER, OF OAKLAND, CALIFORNIA.

RAKE.

Application filed May 10, 1923. Serial No. 638,109.

*To all whom it may concern:*

Be it known that I, HERBERT G. KIMBER, a citizen of the United States, and a resident of Oakland, county of Alameda, State of California, have invented a new and useful Rake, of which the following is a specification.

The present invention relates to improvements in rakes and its particular object is to provide a rake that will be particularly strong and rugged in construction while adapted to be made very cheaply. It is particularly proposed to disclose a rake in which the teeth are not merely secured with one end to a back or holding member, but in which a substantial part of each tooth is engaged by the holding member, which makes the construction very strong and makes it practically impossible for a single tooth to break, since all the teeth are firmly united into one unit so that each tooth serves to brace and strengthen the other teeth. Further objects and advantages of my device will appear as the specification proceeds.

The preferred form of my invention is illustrated in the accompanying drawing in which Figure 1 shows an end view of my rake; Figure 2 a top plan view with a portion of the handle broken away; Figure 3 a side view; Figure 4 a perspective detail view of a specially designed holding member for the rake teeth; and Figure 5 a perspective view of two rake teeth joined to form a U. While I have shown only the preferred form of the invention, I wish to have it understood that various changes or modifications may be made within the scope of the claims hereto attached without departing from the spirit of the invention.

The handle (1) of my rake may be made of any suitable form. The holding member (2) for the rake teeth comprises a plate (3) disposed transversely relative to the handle with its central portion in engagement with the end of the same. It is provided with a top flange (4) and a bottom flange (6) and the two flanges are perforated as shown at (7) to allow the teeth (8) to pass therethrough. The teeth are preferably made in pairs in U shape as shown in Figure 5, so that the base (9) of each pair remains above the upper flange. The latter flange has an extension thereon which is bent around the top ends of the teeth as shown at (11) so as to hold the teeth against upward motion, and is then guided rearwardly to engage an intermediate portion of the handle to which it is secured in any suitable manner as by the rivets (12). The rearward extension is preferably tapered in the manner shown in Figure 2. The lower flange is preferably curled upon itself as shown at (13) to strengthen the same.

The central portion of the plate (3) is secured to the handle by means of a clip (4) engaging two adjacent teeth from the outside and a screw (16) passing through the clip and the plate into the end of the handle. The side wings of the plate (3) are further fastened to the handle by means of a brace (17). The latter may be a simple piece of wire passing through the handle as shown at (18) and fastened to the handle by means of hooks (19) from which it extends in both directions to engage the side wings. To render the latter engagement particularly strong I again provide clips (21) engaging the outside of two or more adjacent teeth and small bolts (22) extending through the clip between the teeth and through the plate. Each end of the wire is coiled around the bolt as shown at (23) and held in place by a nut (24).

It will be seen from the foregoing description that each tooth is held in two places, one being near the top and one near the center of each tooth. The fact that each two teeth form a pair gives additional strength to the device, and the further fact that all the teeth are braced near their central portion by one common element makes it almost impossible for a single tooth to break. It should also be mentioned that the teeth being used to fasten the plate to the handle by means of the clips (14) and (21), the plate itself may be of comparatively light material, since the strain on the plate is light.

I claim:

1. In a rake, a handle, a transversely arranged channel plate secured to the handle, rake tines passing through both legs of the channel and bent over against the outer surface of one leg, the plate having an extension from the latter leg folded over the bent ends of the tines to retain them in the channel.

2. In a rake, a handle, a transversely arranged channel plate secured to the handle, a plurality of U-shaped double tines passing through both legs of the channel with the bends lying against one of the legs, the plate having an extension from the latter leg folded over the bent ends of the tines and secured to the rake handle.

3. A rake comprising a handle, a plate disposed transversely thereto having flanges extending therefrom, a plurality of teeth supported in the flanges so as to lie against the plate and means for securing the plate to the handle comprising means for directly fastening a central portion of the plate to the end of the handle, an extension of one flange guided rearwardly to engage an intermediate portion of the handle and lateral braces engaging side portions of the plate with the handle.

HERBERT G. KIMBER.